Sept. 27, 1966 J. REHM ETAL 3,275,958

U.H.F.-V.H.F. TUNER WITH SWITCHABLE COMMON ELEMENTS

Filed Sept. 15, 1964

INVENTORS
Josef Rehm &
Robert Mittenhuber

BY Spencer & Kaye
ATTORNEYS

United States Patent Office 3,275,958
Patented Sept. 27, 1966

3,275,958
U.H.F.-V.H.F. TUNER WITH SWITCHABLE COMMON ELEMENTS

Josef Rehm, Wolnzach Bahnhof, and Robert Mittenhuber, Ingolstadt, Germany, assignors to Telefunken Patent-verwertungs-G.m.b.H., Ulm (Danube), Germany
Filed Sept. 15, 1964, Ser. No. 396,560
Claims priority, application Germany, Sept. 18, 1963, T 24,727
19 Claims. (Cl. 334—3)

Figure 1:
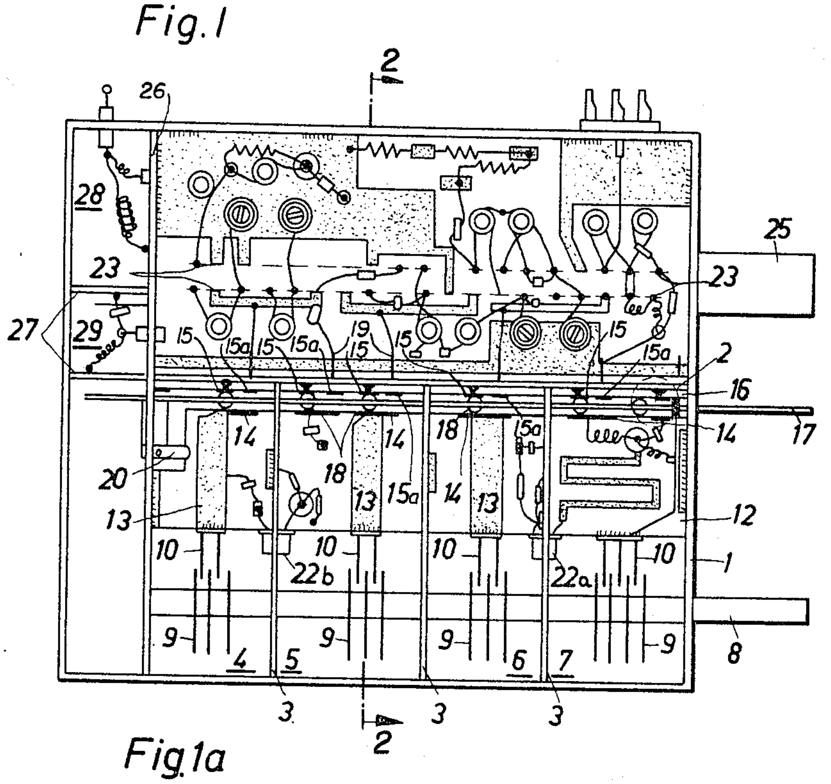

The present invention relates to a channel selector switch for use in television sets, which switch is a combination switch usable for both U.H.F. (ultra-high frequency) and V.H.F. (very-high frequency) reception, the U.H.F. range being that portion of the frequency spectrum which is between 300 and 3,000 megacycles and the V.H.F. range being that portion of the frequency spectrum which is between 30 and 300 megacycles. Each range may be considered to incorporate one or more so-called bands, and, in accordance with present designations conventionally used in European television transmission, Band I is a frequency range of 68 to 41 megacycles (wave length: 4.41 to 7.32 meters), Band III is a frequency range of 223 to 174 megacycles (wave length: 1.35 to 1.72 meters), and Band IV is a frequency range of 790 to 470 megacycles (wave length: 38 to 63.8 centimeters). Bands I and III thus fall into the V.H.F. range while Band IV falls into the U.H.F. range. Within each band are a certain number of individual channels, i.e., relatively narrow frequency bands, each used for transmitting and receiving a typical television broadcast.

A typical channel switch is provided with a capacitatively tunable resonant tank circuit for operation in the U.H.F. range and with inductances which, to enable the tuner to be used in the V.H.F. range, can be switched in series with the inner conductors of the resonant tank circuits, the resonant tank circuits and the inductances being arranged in a common housing.

In one type of television channel switch, the housing is divided into four chambers, through which passes a rotary shaft carrying the rotors of multiple or so-called ganged capacitors, and through which chambers also passes the switching shaft of a rotary switch which serves as the band selector switch, the two shafts being generally parallel to each other. The stators of the individual tuning capacitors serve to carry the anodes of disc triodes and also form parts of the resonant lines which, for U.H.F. reception, are connected with the side walls of the chambers, by being connected, with as short a connection as possible, with the band switch, while, for V.H.F. reception, the inductance is increased by serially connecting coils which are arranged on the rotary switch.

Television channel selector switches of the above type suffer from the drawback that the inductances needed for V.H.F. operation are located within the chambers which are fashioned as the tank circuits for U.H.F. reception. Experience has shown that this type of construction presents substantial difficulties insofar as electrically aligning, i.e., calibrating or balancing, the switch is concerned, because, in order to allow the coils to be aligned for V.H.F. operation, the U.H.F. tank circuits have to be opened. But once such a tank circuit has been opened, namely, by removing its cover, it can never be restored to precisely its previous condition inasmuch as the cover can not be made to occupy exactly the same position as before. This results in geometric changes which, in turn, introduce electrical de-tuning.

Furthermore, there is the danger that the coils needed for V.H.F. operation will be electrically or magnetically coupled with the U.H.F. resonant tank circuits, so that the V.H.F. coils will, due to their inductance and their own inherent capacitance, act as series or parallel resonant circuits for certain frequencies in the U.H.F. range, thereby to generate so-called "noise," i.e., undesired signals, or distortion of the pass band characteristic.

Yet another drawback of the above-described structure is that it is not readily possible to obtain proper shielding against radiation.

There also exist television receivers which are provided with two separate channel selector switches, one for V.H.F. operation and the other for U.H.F. operation, the two switches being two separate structural units. This, however, means that, for all practical purposes, there is a duplication of the mechanical and electrical parts. Nevertheless, the use of two separate channel selector switches has come into favor, mainly because the switching in of additional inductances into the resonant tank circuits has been found to result in frequency distortion, side or spurious resonance conditions and undesired damping, especially in the U.H.F. range. The reason for this is that if but one tuning capacitor is used, the inner conductor of the tank circuit must, for purposes of changing over between U.H.F. and V.H.F. operation, be split up by means of a switch. Such a switch will, at the high frequencies involved, have not only an ohmic contact resistance but also a high reactance, which results in the above drawback.

It is, therefore, the primary object of the present invention to avoid the necessity of building two separate channel selector switches into a television receiver and to provide instead a television channel switch which is usable for both U.H.F. and V.H.F. operation and which nevertheless overcomes the above drawbacks.

With the above object in view, the present invention resides, mainly, in a channel selector switch which comprises a housing having arranged therein a main partition dividing the housing into U.H.F. and V.H.F. parts (the housing and partition constituting so-called "ground"). Arranged in the U.H.F. part are capacitatively tunable resonant tank circuit means which include inner conductors each having one end directed toward the partition, while the V.H.F. part has arranged in it suitable inductance means which incorporate a plurality of inductances. Change-over switch means are provided for connecting the inductance means to the inner conductors of the resonant tank circuit means to adapt the switch for V.H.F. operation. According to the present invention, the switch means are arranged in the region of the partition and are movable between a U.H.F. position wherein the mentioned one end of each of the inner conductors is connected directly to ground and a V.H.F. position wherein this end of each conductor is connected to a respective one of the inductances.

Additional objects and advantages of the present invention will become apparent upon consideration of the following description when taken in conjunction with the accompanying drawings in which:

FIGURE 1 is a plan view of a channel selector switch according to the present invention, the cover for the housing having been removed to permit viewing of the various parts.

Figure 1A:
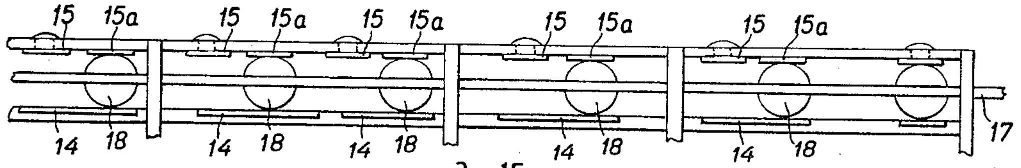

FIGURE 1*a* is a fragmentary view of a part of FIGURE 1, showing the contact arrangement on an enlarged scale and in a different operative position.

Figure 2:
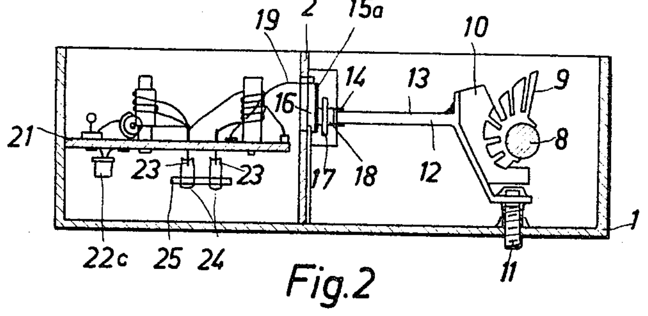

FIGURE 2 is a sectional elevational view taken, generally, on line 2—2 of FIGURE 1.

Referring now to the drawing, the same shows a housing 1 which is divided into two parts by means of a partition 2. The housing 1 and the plate constitute the "ground" of the switch.

One of the parts of the housing, hereinafter referred to as the U.H.F. part, is once again sub-divided, by means of further partitions 3, into chambers 4, 5, 6, 7. Chambers 4, 5, 6, are fashioned as resonant tank circuits for frequencies in the U.H.F. range, while chamber 7 has arranged within it the circuit elements which make up an input circuit which is tunable for the V.H.F. range, but is permanently tuned for the U.H.F. range.

A tuning shaft 8 is rotatably mounted in housing 1 and passes through chambers 4, 5, 6, 7, this shaft 8 carrying four sets of rotors 9, each cooperating with a respective set of stators 10. Each unit 9, 10, constitutes a rotary tuning capacitor, so that there are four ganged capacitors arranged in chambers 4, 5, 6, 7, respectively. The stators 10 are connected, e.g., by soldering, to balancing trimmers 11 as well as to conductors which may, for example, be applied to a carrier plate 12 in the manner of printed circuitry. The conductors in chambers 4, 5, 6, to which the stators 10 are connected represent the inner conductors 13 of quarter wave-length resonant tank circuits.

The ends of these conductors 13 which are directed toward the partition 2 extend past the end face of the carrier plate 12 and serve as contact surfaces 14 of the frequency switch whose other contacts 15, 15*a*, are arranged on an insulating strip 16 which itself is mounted on the partition 2. Arranged in the region of the partition 2 and between the contact surfaces 14 and the contacts 15, 15*a*, is a slide 17 made of insulating material, which, in the region of each contact surface 14, is provided with a resilient contact element 18, by means of which each contact surface 14 can be electrically connected with its respective coacting contact 15 or 15*a*, there being one pair of contacts 15, 15*a*, for each contact surface 14, the latter being elongated in the direction of movement of the slide 17. Each contact 15 is soldered directly to the partition 2, while each contact 15*a* has connected to it a terminal 19 which passes through an opening in the partition 2 and into the V.H.F. portion of the housing 1. The slide 17 is also connected to a further contact 20 by means of which a coupling capacitor, needed for U.H.F. operation, is short-circuited during V.H.F. operation.

Arranged in that part of the housing 1 which is shielded from the resonant tank circuits by means of the partition 2, i.e., the V.H.F. part of the housing, is a plate 21, the same being made of insulating material and lying in a plane which is at right angles to the side walls of the housing 1. The plate 21 may likewise be provided with printed circuitry. The insulating plate 21, as well as the above-mentioned carrier plate 12 are secured to the housing 1, preferably by being soldered thereto by means of that portion of the printed circuitry extending along the edge of the plates. In this way, other circuit components connected to the leads which serve as physical connections, are effectively grounded.

The plate 21 further carries coil carriers carrying the coils for the input circuit filter and the band filter and resonant oscillator circuits, together with suitable trimmers, as well as those resistors and blocking capacitors as are needed for supplying power to the amplifier elements 22*c* (e.g., transistors) and which are not already mounted on the plate 12. Since, as described above, the V.H.F. is divided into Bands I and III, there will be a separate set of coils for each band, the arrangement being such that the coils for Band III—this being the band having, within the V.H.F. range, the higher frequency—being positioned as close as possible to the frequency change-over switch incorporating the components 14, 15, 16, 17, 18.

Change-over within the V.H.F. range, i.e., from Band I to Band III and vice versa, is effected by means of a further slidable switch whose stationary contact blades 23 are set into the insulating plate 21, these contact blades 23 being arranged in two rows parallel to the partition 2. Those contact blades 23 which are to be connected to each other are bridged by means of resilient contacts 24 carried by a carrier 25 which is slidably mounted in the housing 1. The contacts 24 can be brought into any one of, for example, three positions corresponding, respectively, to U.H.F.-Band IV, to V.H.F.-Band I, and V.H.F.-Band III.

The housing 1 may further be provided with yet another partition 26 which forms a narrow chamber, shown in FIGURE 1, to the left of partition 26. This narrow chamber may be subdivided still further by partitions 27, thereby to form a chamber 28 for the IF (intermediate frequency) filter and another chamber 29 for the test leads for aligning the switch, i.e., for allowing the pass characteristic of the switch to be adjusted. These two last-mentioned chambers 28, 29, may be made readily accessible from the outside by providing the end wall of housing 1 with suitable cut-outs which are closed off by a cover. The entire housing may be closed off by a cover which itself may be divided into three parts, of which the first part covers the chamber containing the V.H.F. coils as well as the IF chamber 28 and the test chamber 29, of which the second part covers approximately that half of the width of the housing that includes the length of the conductors 13, and of which the third part covers the remainder of the housing in the region of the tuning capacitors 9, 10.

The channel selector switch operates as follows:

The drawing shows the switch occupying the position for U.H.F. reception. High frequency energy fed from an antenna is applied to an input transistor 22*a* via the input circuit in chamber 7 which, as stated above, is fixedly tuned for U.H.F. operation. This transistor amplifies the incoming signal, and the amplified signal is then applied, via suitable coupling elements, to the band filter which is constituted by the resonant tank circuit in chambers 6 and 5. That portion of the amplified signal which is allowed to pass through the band filter, and which therefore has the desired frequency, is applied to the input of a further transistor 22*b*, serving as the transistor for a self-oscillating mixer stage, whose output is connected to the parts forming the oscillator resonant tank circuit in chamber 4. The IF put out by the mixer stage transistor 22 is applied to yet another transistor 22*c* arranged in the V.H.F. portion of the switch, from whence it is applied to the IF filter in chamber 28. One end of each inner conductor 13 is grounded via its contact 14, one of resilient cantact elements 18, and the respective contact 15 which is soldered to the partition 2, the other contact of the pair, i.e., the contact 15*a* which leads to the V.H.F. portion, being out of direct galvanic contact with the respective inner conductor. Nevertheless, each of these contacts 15*a* is intentionally grounded by means of the slide member 23, 24, 25, arranged in the V.H.F. part of the housing, the purpose of this being to avoid any U.H.F. energy from reaching the V.H.F. coils, e.g., by capacitative coupling, which would cause spurious resonances and dampings in the characteristic, as well as noise.

The switch is changed over from U.H.F. operation to V.H.F. operation simply by moving slide 17 rightwardly as viewed in FIGURE 1 into the position shown, on an enlarged scale in FIGURE 1*a*, so that the contact elements 18—which remain in contact with the contact surfaces 14—come to engage the contacts 15*a* connected to the inductances in the V.H.F. part of the switch. The inner conductors 13 then become leads between the V.H.F. iductances and the tuning capacitors 9, 10. Before this change-over, the contacts 15 grounded during U.H.F. operation will have been disconnected from ground by moving the slide member 23, 24, 25, and, depending on the new position of the slide member 23, 24, 25, the contacts 15*a* will be connected to the inductances intended for Band I operation or to the inductances intended for Band III operation.

According to another feature of the present invention, the slide may be complemented to serve as a change-over switch, for the transistors. For example, the transistor which operates as a self-oscillating mixer stage during U.H.F. operation may be connected to operate as an oscillator during V.H.F. operation, and the transistor which serves as the IF amplifier during U.H.F. operation, may be connected to operate as the mixer transistor during V.H.F. operation.

It will be understood that the above description of the present invention is susceptible to various modifications, changes, and adaptations, and the same are intended to be comprehended within the meaning and range of equivalents of the appended claims.

What is claimed is:

1. For use in a television receiver, a combined U.H.F. and V.H.F. channel selector switch comprising, in combination:

(a) a housing;

(b) a main partition arranged in said housing and dividing the same into a U.H.F. part and a V.H.F. part, said housing and partition constituting "ground";

(c) capacitatively turnable resonant tank circuit means arranged in said U.H.F. part of said housing, said resonant tank circuit means including inner conductors each having one end directed toward said partition;

(d) inductance means incorporating a plurality of inductances arranged in said V.H.F. part; and (e) change-over switch means for connecting said inductance means to said inner conductors of said resonant tank circuit means to adapt the switch for V.H.F. operation, said switch means being arranged in the region of said partition and movable between a U.H.F. position wherein said one end of each of said inner conductors is connected directly to ground and a V.H.F. position wherein said one end of each of said inner conductors is connected to a respective one of said inductances.

2. A switch as defined in claim 1 wherein said inductances are galvanically disconnected from said inner conductors when said switch means are in said U.H.F. position.

3. A switch as defined in claim 1, further comprising additional partitions arranged in said U.H.F. part and dividing the same into a plurality of chambers each forming part of a respective resonant tank circuit, said main partition forming one wall of each of said chambers.

4. A switch as defined in claim 3 wherein said resonant tank circuit means include a carrier plate lying in a plane at right angles to said partitions and being provided with printed circuitry which includes said inner conductors.

5. A switch as defined in claim 1, further comprising a carrier plate arranged in said V.H.F. part and lying in a plane at right angles to said partition, said carrier plate carrying said inductances.

6. A switch as defined in claim 1 wherein said switch means include a slide mounted for movement along said partition.

7. A switch as defined in claim 6 wherein said inner end of each conductor has an elongated contact surface extending in the direction of movement of said slide.

8. A switch as defined in claim 7 wherein said switch means include a plurality of pairs of contacts, the contacts of each pair coacting with one of said inner conductors and being arranged opposite said elongated contact surface thereof, one contact of each pair being connected directly to ground and the other contact of each pair being connected to the inductance with which the respective inner conductor is to be connected during V.H.F. operation, said slide carrying a plurality of bridging contacts each coacting with a respective one of said contact surfaces and the pair of contacts pertaining thereto for connecting each inner conductor to said one contact of the respective pair when said switch means is in said U.H.F. position and for connecting each inner conductor to said other contact of the respective pair when said switch means is in said V.H.F. position.

9. A switch as defined in claim 8 wherein said one contact of each pair is connected directly to said partition.

10. A switch as defined in claim 1 wherein said inductance means includes two sets of inductances, there being, in each set, one inductance which coacts with a respective inner conductor, thereby to enable the switch to be used in two bands within the V.H.F. range.

11. A switch as defined in claim 10 wherein the inductances of the set pertaining to operation in the higher of the two bands in the V.H.F. range are arranged physically closer to said partition than are the inductances of the set pertaining to operation in the lower of the two bands in the V.H.F. range.

12. A switch as defined in claim 11 wherein said two sets of inductances are carried by an insulated carrier plate arranged in said V.H.F. part of said housing and lying in a plane at right angles to said partition.

13. A switch as defined in claim 12 wherein said carrier plate is provided with a switching device coacting with said change-over switch means for enabling the latter to connect said inner conductors, selectively, either to the inductances of said first set or to the inductances of said second set.

14. A switch as defined in claim 13 wherein said switching device includes contacts connected to said inductances, and a slide mounted for movement along said inductance contacts between two positions, in one of which said slide engages the contacts of the inductances of said first set and the other of which said slide engages the contacts of the inductances of said second set.

15. A switch as defined in claim 14 wherein said change-over switch means include a slide member mounted for movement along said partition, wherein said inner end of each conductor has an elongated contact surface extending in the direction of movement of said slide member, and wherein said change-over switch means further include a plurality of pairs of contacts, the contacts of each pair coacting with one of said inner conductors and being arranged opposite said elongated contact surface thereof, one contact of each pair being connected directly to ground and the other contact of each pair being connectible to said switching device, said slide member carrying a plurality of bridging contacts each coacting with a respective one of said contact surfaces and the pair of contacts pertaining thereto for connecting each inner conductor to said one contact of the respective pair when said switch means is in said U.H.F. position, thereby grounding said inner conductors, and for connecting each inner conductor to said other contact of the respective pair when said switch means is in said V.H.F. position, thereby connecting each inner conductor, via said switching device, to the respective inductance of the particular set of inductances switched in by said switching device.

16. A switch as defined in claim 15 wherein said slide of said switching device is movable also to a third position in which said other contact of each of said pair of contacts is connected directly to ground.

17. A switch as defined in claim 12 wherein said carrier plate is provided with printed circuitry connected to said inductances.

18. A switch as defined in claim 1, further comprising insulated carrier plate means arranged in at least one of said housing parts and lying in a plane which is at right angles to the wall means forming said housing and to said partition, said plate means being provided with printed circuitry at least some of which runs along the edge of said plate means and is soldered to said wall means.

19. A switch as defined in claim 1 wherein said housing is closed off by a cover which itself is divided into three parts, the first part covering said V.H.F.-part, the second part covering approximately that half of the width of said housing that includes the length of said inner conductors and the third part covering the remainder of said housing in the region of said capacitively tuning means.

No references cited.

HERMAN KARL SAALBACH, *Primary Examiner.*

R. F. HUNT, *Assistant Examiner.*